ly within the body and formed from a material having a second index of refraction higher than the first index. The lens has an arcuate lower bifocal segment surface lying generally parallel to the outer edge of the lens body and terminating at a pair of outer end portions which are spaced from each other by a first included angle. The upper bifocal segment surface has at least three elements including a first, radially inner partially circular surface element disposed generally inwardly of the lens, and terminating at a pair of inner end portions spaced from each other by a second included angle. The second and third upper bifocal segment surface elements extend respectively between the outer and inner end portions, with the included angles being less than 170°, and the first included angle being no larger than the second included angle. The uppermost portion of the segment surface thus lies below the center of the lens and the second and third surfaces extend at least partially downwardly from the inner end portions when the lens is oriented to its intended position of use.

United States Patent [19]

Tsuetaki

[11] 4,302,081
[45] Nov. 24, 1981

[54] FUSED BIFOCAL CONTACT LENS

[76] Inventor: George F. Tsuetaki, 4343 N. Clarendon, Chicago, Ill. 60613

[21] Appl. No.: 30,891

[22] Filed: Apr. 17, 1979

Related U.S. Application Data

[63] Continuation of Ser. No. 789,870, Apr. 22, 1977, abandoned.

[51] Int. Cl.³ .............................................. G02C 7/04
[52] U.S. Cl. ................................................... 351/161
[58] Field of Search ............... 351/161, 164, 168, 170, 351/172

[56] References Cited

U.S. PATENT DOCUMENTS 3,684,357  8/1972  Tsuetaki .............................. 351/161

FOREIGN PATENT DOCUMENTS 910455  11/1962  United Kingdom ................. 351/161

OTHER PUBLICATIONS

Encyclopedia of Contact Lens Practice; vol. II, Supplement 7, Chapter XXXI; Nov. 15, 1960; p. 37.
Kendall, C. A.; "Ultrafocal ® Bifocal Contact Lens", Contacto, Jan. 1976, pp. 31-35.

Primary Examiner—John K. Corbin
Assistant Examiner—Scott J. Sugarman
Attorney, Agent, or Firm—James T. FitzGibbon

[57] ABSTRACT

A bifocal contact lens having a principal, distant vision body portion made from a material having a first index of refraction, and a bifocal segment fused in place at least partial 4 Claims, 6 Drawing Figures U.S. Patent    Nov. 24, 1981    4,302,081
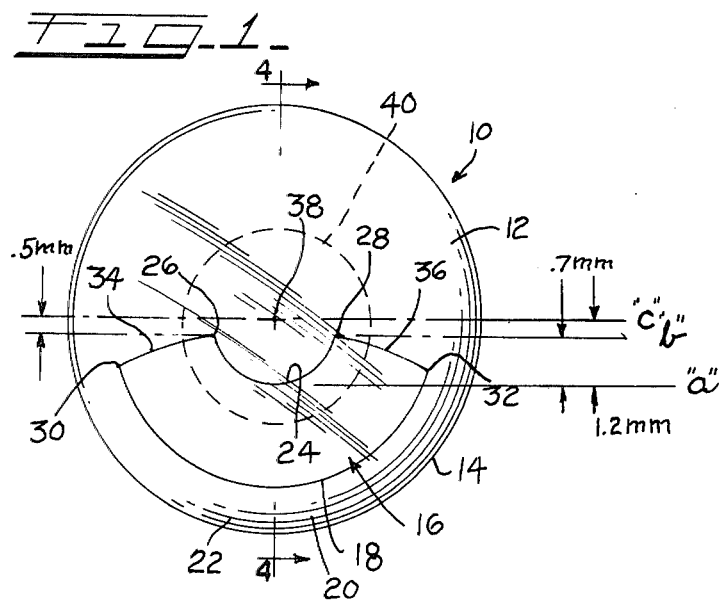
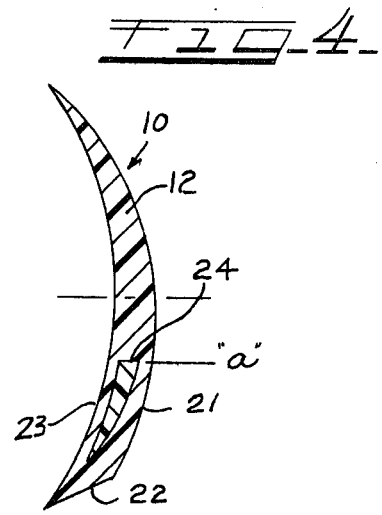
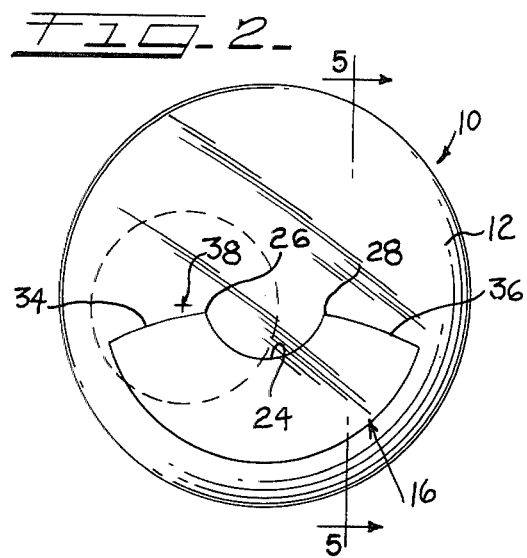
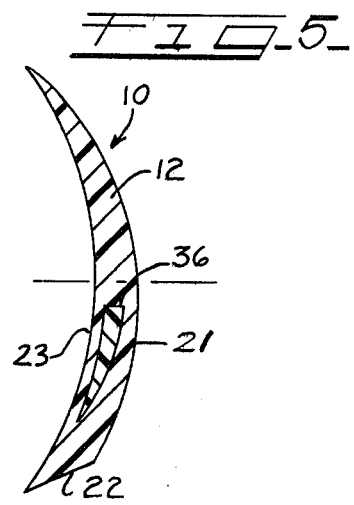
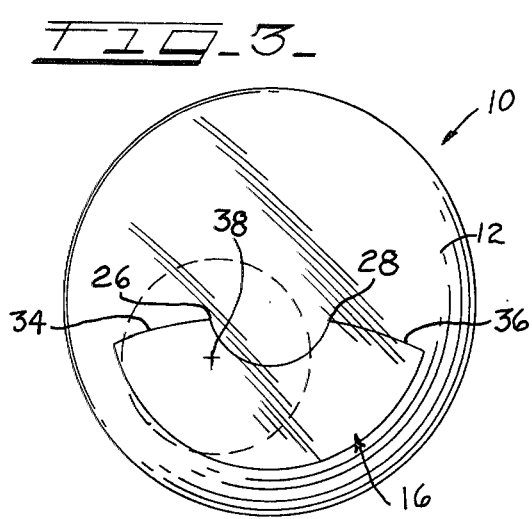
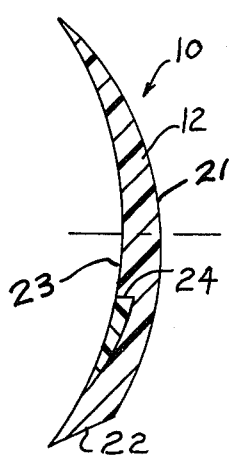

FUSED BIFOCAL CONTACT LENS

This is a continuation of application Ser. No. 789,870, filed Apr. 22, 1977 now abandoned.

BACKGROUND OF THE INVENTION

The present invention relates generally to contact lenses, and more particularly, to a corneal contact lens unit which includes a specifically designed and shaped, fused-in-place bifocal segment.

The present invention is directed toward a bifocal contact lens which is based on sound optical principles, but which is designed to allow greater latitude in fitting without sacrificing both desirable characteristics of both distant vision and near vision.

Bifocal contact lenses are well known in the art. The earliest bifocal contact lenses were those in which the bifocal segments were designed to shapes or configurations which were the same as their counterparts found in spectacle bifocals. These included the type wherein the upper surface of the bifocal segment was a straight, horizontally extending line, or an upwardly directed arcuate convex line or surface. Other bifocal segments in contact lenses included the fully circular segment, which provides a bifocal or close vision zone completely surrounding the distant vision or central portion of the lens.

Another type of bifocal contact lens which is now in general use is a bifocal lens wherein the upper surface of the bifocal segment appears in front elevation as a slight curve or crescent configuration, with the center portion of the segment being lower than the outer edges thereof when the lens is in a position of use on the wearer. This configuration of segment is probably the most popular one in use today.

As shown in U.S. Pat. No. 3,684,357, there are also bifocal segments of the type which incorporate a compound or so-called bi-curved upper surface shape, that is, an upper surface having a curvilinear central portion of a first radius, and outer edge portions extending outwardly and upwardly therefrom in a curve of much larger radius. The upper segment line thus appears as a downwardly extending, larger radius arc having a central portion extending further therebeneath and characterized by a much smaller radius.

In certain bifocal applications, it is desired to arrange the bifocal contact lens so that distant vision is obtained by the viewer when looking straight ahead or slightly downwardly, and so that near vision is provided as the user casts his eyes more sharply downwardly. Certain contact lens users, including draftsmen, typists, and others who customarily use left-to-right eye movements in their work, desire a bifocal contact lens wherein the user may look through the bifocal segment when looking laterally and slightly downwardly, as well as when looking downwardly only. The type of bifocal segment described in U.S. Pat. No. 3,684,357 shows such a segment. The present invention represents an improvement over the type of bifocal segment described and claimed in such patent, and is intended to provide greater convenience in use for the user, increased usable reading fields on both downward and down-and-lateral vision, and other advantages as well.

In view of the shortcomings of known prior art lenses, it is an object of the present invention to provide an improved fused bifocal corneal contact lens.

Another object is to provide a bifocal contact lens having a bifocal segment of a novel configuration which is used in a fused or one-piece bifocal contact lens unit.

Still another object is to provide a contact lens which allows greater latitude in fitting without sacrificing either distant or near vision capabilities.

A still further object is to provide a bifocal contact lens which may be made by known methods, but which is free of the drawbacks associated with even the most advantageous prior art bifocal lenses.

Still another object of the present invention is to provide a bifocal contact lens having a bifocal segment designed to permit the use of less prism in the lens and which is more tolerant to rotation from the horizontal axis without loss of the wearer's ability to view objects through the segment for close vision.

A still further object is to provide a segment design which provides the maximum distance field in the lens consistent with a largely increased reading field which is usable by the viewer without the drawbacks associated with prior art lenses.

Another object is to provide a bifocal contact lens having a reading field which is disposed in use very close to the visual axis and which is thus accessible to the viewer without exaggerated eye movements.

A still further object is to provide a lens which provides the advantages of the convenience of a good bifocal contact lens and which maintains these advantages even if fit somewhat loosely by the practitioner (the person fitting the lens to the user). A still further object is to provide a lens in which the extremities of the bifocal segment do not cut across the visual axis even if the lens is fitted so loosely as to permit undue ease of rotation on the eye, or if the lens rotates somewhat for any reason.

A still further object is to provide a fused bifocal contact lens having a near vision segment which includes an upper segment surface or line or surface having a central portion of an arcuate shape and lateral portions extending outwardly and downwardly from the point at which the upper segment line meets the circular portion thereof.

The foregoing objects and advantages are achieved by providing a bifocal contact lens which includes a bifocal segment having an upper bi-curve segment surface defined by a radially inner, partially circular first element and by outwardly and slightly downwardly extending second and third elements extending between the ends of the inner surface and the outer surface of the segment, with the ends of the inner surface lying below the center of the lens.

The exact manner in which these and other objects and advantages are achieved in practice will become more clearly apparent when reference is made to the foregoing detailed description of the preferred embodiments of the invention set forth by way of example and shown in the accompanying drawings, in which like reference characters indicate corresponding parts throughout.

BRIEF DESCRIPTION OF THE DRAWINGS

FIG. 1 is a front elevational view of the bifocal contact lens of the invention, showing a configuration of the novel bifocal segment and the disposition of the pupil of the wearer relative to the lens when the wearer is looking straight ahead;

FIG. 2 is a view similar to that of FIG. 1, but showing the pupil of the wearer in phantom lines as being laterally displaced;

FIG. 3 is a view similar to FIGS. 1 and 2, but showing the pupil of a viewer in phantom lines as being displaced both laterally and downwardly;

FIG. 4 is a vertical sectional view of the lens of the invention, taken along lines 4—4 of FIG. 1;

FIG. 5 is a vertical sectional view of the lens of FIG. 2, taken along lines 5—5 thereof; and FIG. 6 is a vertical sectional view of another form of lens which may embody the present invention.

DESCRIPTION OF THE PREFERRED EMBODIMENTS OF THE INVENTION

The present invention is useful with known types of corneal contact lenses, including those which are generally prismatic in shape, so as to orient the bifocal segment to the lower portion of the eye in use, as well as those bifocal contact lenses which achieve orientation by other means, including the disposition of small weight or the like within the body of the lens.

The invention is preferably used in lenses wherein the bifocal segment is entirely surrounded by the lower index (of refraction) material used in formation of the distant vision portion of the lens, but is also useful in those fused bifocal contact lenses in which a portion of the higher index material is exposed for contact with the tear layer overlying the cornea.

In the specification and claims, it will be understood that the bifocal segment lies in the lower portion of the lens when the lens is oriented, and therefore, reference will be made to the elements of the lens in this orientation.

Referring now to the drawings in greater detail, FIG. 1 shows a bifocal contact lens generally designated 10 which embodies the present invention. The lens 10 includes a main body or distant vision portion generally designated 12, which terminates in outer edge portion 14 thereof. The bifocal segment is generally designated 16 and lies within the body 12 of the lens 10 where it is fused in place according to methods known to those skilled in the art.

The outermost edge 18 of the segment 16 is spaced apart from the edge 14 of the distant vision portion 12 by margin 20. This margin 20 includes, adjacent the outer margin thereof, a beveled surface 22. The beveled surface 22 extends between and joins the outer or front surface 21 to the rear or base curve surface 23. Inasmuch as the front surface curve 21 is spaced farther apart from the rear surface 23 at the bottom portion of the lens, the lens itself has a prismatic shape (FIGS. 4–6) and is thicker and more massive at the lower portion thereof.

The beveled or truncated surface 22 not only joins the surfaces 21, 23 at the lower portion of the lens, but also serves in practice to engage the lower lid and thus limit downward movement of the lens. This, in turn, permits the pupil to move downward relative to the lens so that the center of vision will pass through the bifocal segment 16. Forming a prismatic lens, or using other known methods such as embedding a weight in the lens margin, may be used to insure that the bifocal segment remains in the proper orientation.

As is known to those skilled in the art, the beveled surface 22 may be of a greater radius than that of the exterior edge 14 of the lens, and may cut across what would normally be the lower edge of the lens, with the result that the lens may be non-circular when viewed from the front. Since this is not always the case, and is not a necessary feature of the invention, this feature is not shown in detail.

According to the invention, the bifocal segment 16 is made in a shape novel in fused bifocal contact lenses. The segment is defined by and includes an outer, arcuate edge 22 of partially circular shape, and a radially inner surface 24 which is arcuate and also preferably partially circular when viewed from the front.

As will be noted from FIGS. 4–6, and as is known to those skilled in the art, the top portion 24 of the segment 16 is actually defined by a surface which is shown to extend from left to right in FIG. 4, for example. However, this surface has a small extent lying generally parallel to the line of sight of the viewer, and because of this minimal extent, the surface often appears to be merely a line. It is, therefore, often referred to in the art as a segment "line" rather than a segment surface.

This segment surface 24 is shown to terminate in a pair of first or inner ends 26, 28, which are spaced apart from each other and which subtend an included angle therebetween of more than 90° but less than 180°. The preferred manner of determining this angle will be referred to elsewhere herein. FIG. 1 also shows that the outer edge or outer surface 18 of the segment 16 terminates in a pair of spaced apart, second or outer end portions 30, 32. The included angle between the outer ends 30, 32 is also preferably less than 180°, as will further appear, and is preferably an angle of about the same order or perhaps a smaller order than the angle between the inner ends 26, 28.

A radially outwardly and downwardly extending second segment surface 34 extends between the inner and outer ends 26 and 30, and a counterpart or third upper segment surface 36 extends between the inner end 28 and the outer end 32 of the bifocal segment. Accordingly, the segment 16 as a whole can be said to be defined by the lower arcuate surface 18, the parallel inner arcuate surface 24, and the second and third upper bifocal segment surfaces 34, 36. The upper bifocal segment surface may be referred to as a bi-curve surface, considering that the surfaces 24, 36 would be a single curve if not interrupted by the first curved surface 24 which terminates in the ends 26, 28.

Referring again to FIG. 1, there is shown a central cross 38 which represents the sight line or viewing axis of the viewer, whose eye includes a pupil 40 designated by dotted lines. In a typical lens application, the lowest extent of the inner bifocal segment surface 24, line "a" lies 1.2 millimeters below the sight line, while the inner edges or corners 26, 28 of the segment 16, line "b", lie about 0.5 millimeters from the center line of the eye, shown as being intersected by line "c".

An important feature of the invention is that the radius of the inner surface 24 of the segment 16 is about 1.0 millimeters, and accordingly, the distance between points 26 and 28 is about 2.0 millimeters. Typically, the extent between the inner corner 26 and the outer corner 30 of the surface 34 is also about 2.0 millimeters, as is the length of the counterpart surface 36. The bifocal segment surface as a whole has a diameter of about 6.0 millimeters and the lens as a whole may have a diameter of about 9.0 to 9.2 millimeters. In the prior art, where the upper surface of the bifocal segment was a curve with a lower center portion and slightly raised edges, the radius of the upper surface of the segment was much greater, perhaps 5.0 to 8.0 millimeters or more.

Because of the bi-curve shape of the present invention, which includes the small radius surface 28 as well as the outwardly and downwardly extending larger surfaces 24, 36, when the eye moves from side to side as shown in FIG. 2, the sight line does not pass through any portion of the segment 16. However, with the eye being cast fully or partially down, the sight line of the viewer passes through the bifocal segment. According to the invention, the sight line is able to do so throughout a broad range of lateral movements, that is, through the entire arc subtended by an angle having its apex in the lens center and lying between the ends 26, 28 of the inner part of the segment surface 24.

One advantage of the present invention is that where a bifocal lens is intended to be used by a person desiring to have an increased usable bifocal segment or reading field, the segment line lies close (within 1.2 millimeters) to the lens center even among a broad range of pupil positions. In other words, since the surface 24 is partially circular, the displacement of the eye relative to the lens in an amount of 1.2 millimeters will be sufficient to cause the sight line to pass into and through the bifocal segment, not only in a relatively straight down movement of the pupil, but also in a down-and-lateral movement between 45° and 80°, for example.

Another feature of the invention is the radially outward and downward extent of the surfaces 34, 36. In the prior art, lenses have been proposed wherein the edges 26, 28 lay at the same height as, or above, the center of vision, with the outer edges of the bifocal segment being further raised with respect thereto, thus following the prior art principle that the segment should have a lower center portion and raised edges. The present invention, however, uses a bi-curve with lower outer edges and a radially inner, upper lens segment having a lowered central portion but a greatly reduced radius of the order of 1.0 millimeter.

It will thus be seen that the present invention provides a novel fused bifocal contact lens having a number of advantages and characteristics including those pointed out above and others which are inherent in the invention. A preferred embodiment of the invention having been described by way of illustration, it is anticipated that changes and modifications of the described bifocal contact lens will occur to those skilled in the art and that such changes and modifications may be made without departing from the spirit of the invention or the scope of the appended claims.

I claim:

1. A bifocal contact lens unit having a principal, distant vision body portion made from a material having a first index of refraction, and a bifocal segment fused in place at least partially within said lens body and formed from a material having a second index of refraction higher than said first index, said lens unit having a given optical center, said bifocal segment lying entirely below said center and having upper and lower bifocal segment surfaces, said lower surface extending through a circular arc of not more than 170°, but greater than 90°, said arc having its center at said optical center and lying generally parallel to the outer edge of the lens body, and terminating at a pair of outer end portions, said upper segment surface being a three-portion segment surface having a first surface portion extending through said circular arc of not more than 170°, but greater than 90° being disposed generally centrally of said lens, having a radius of about 1.0 to about 1.2 millimeters, and terminating at a pair of inner end portions, said second and third surface portions extending outwardly, respectively, from said inner end portions and joining said respective outer end portions of said lower surface, said inner end portions being spaced downwardly from said lens center, said bifocal segment being constructed and arranged so that when said lens is oriented in its intended position for use, the line of sight of a user may move horizontally from left to right without passing through said bifocal segment, and whereby said line of sight falls entirely within said bifocal segment during horizontal eye movements when said lens is displaced upwardly.

2. A bifocal contact lens as defined in claim 1 in which said material having said first index of refraction completely covers said bifocal segment so that no surface portion of said bifocal segment is exposed on the exterior of said lens.

3. A bifocal contact lens as defined in claim 1 in which said lens body has a front surface portion and a rear surface portion, said front surface portion being arranged so that the lens body is thicker in front-to-rear cross section at the lower portion thereof than at the upper portion thereof, said lens thereby having a prismatic cross sectional shape and being thereby adapted to orient itself in position on the eye of the wearer with said bifocal segment portion lying over the lower portion of the pupil and cornea.

4. A bifocal contact lens as defined in claim 1 wherein said second and third upper surfaces are slightly curvilinear surfaces.

* * * * *